(12) United States Patent
Jamie

(10) Patent No.: US 8,408,779 B2
(45) Date of Patent: Apr. 2, 2013

(54) ILLUMINATED MOUSE PAD

(76) Inventor: Limber Jamie, Phoenix, AZ (US)

( * ) Notice: Subject to any disclaimer, the term of this patent is extended or adjusted under 35 U.S.C. 154(b) by 0 days.

(21) Appl. No.: 13/199,690

(22) Filed: Sep. 7, 2011

(65) Prior Publication Data

US 2013/0058129 A1    Mar. 7, 2013

(51) Int. Cl.
*F21V 7/00*    (2006.01)
(52) U.S. Cl. ........ 362/625; 362/610; 362/612; 362/613; 362/235; 362/343; 362/355
(58) Field of Classification Search ........................ None
See application file for complete search history.

(56) References Cited

U.S. PATENT DOCUMENTS

| 6,635,336 | B1 | 10/2003 | Chen et al. |
| 7,175,310 | B1 | 2/2007 | Cotterell |
| 2002/0131270 | A1 | 9/2002 | Niemuth |
| 2004/0224107 | A1 | 11/2004 | Lewis |
| 2007/0152977 | A1 * | 7/2007 | Ng et al. ........................ 345/173 |
| 2011/0232211 | A1 * | 9/2011 | Farahi ........................ 52/173.3 |

* cited by examiner

*Primary Examiner* — Ashok Patel
(74) *Attorney, Agent, or Firm* — The Halvorson Law Firm

(57) ABSTRACT

An illuminated mouse pad having a light guide having a top side, a bottom side and a perimeter side, a light source for directing emitted light through a first portion of the perimeter of the light guide, and an array of light diffusers located on the bottom side of the light guide, said light diffusers capable of diffusing or spreading out or scattering light emitted by the light source to give a soft back light to the top side.

6 Claims, 7 Drawing Sheets

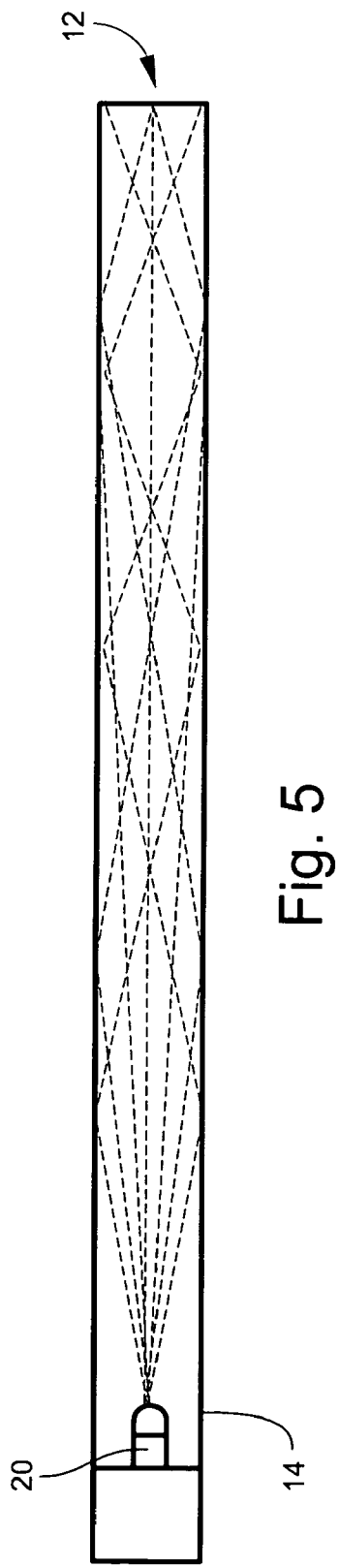
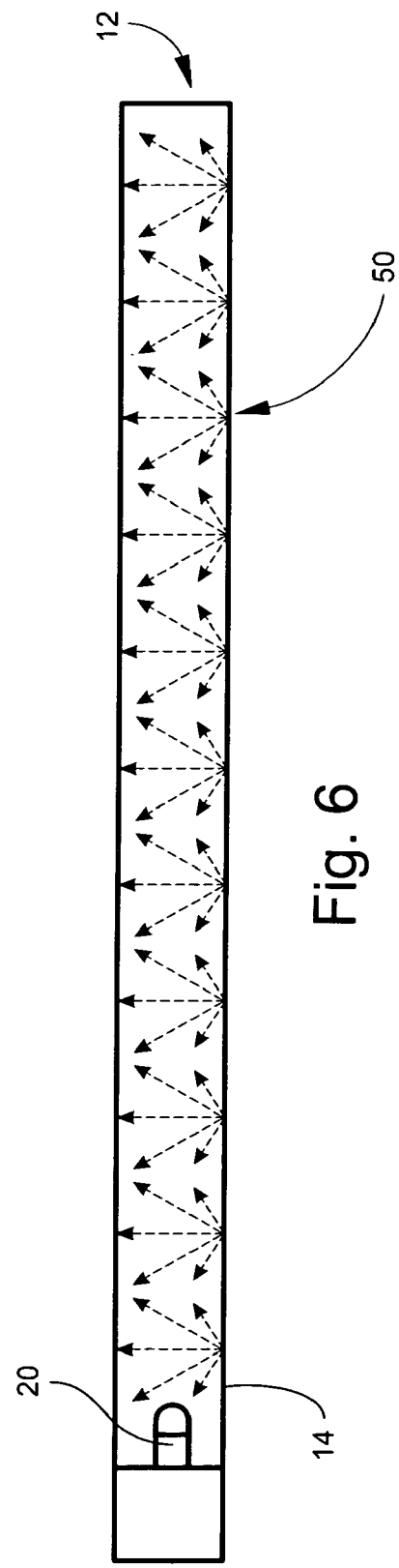

ILLUMINATED MOUSE PAD

FIELD OF INVENTION

The present invention relates to illuminated computer mouse pads.

BACKGROUND OF INVENTION

The present invention relates to illuminated computer mouse pads, and particularly to the method and device for illumination in said computer mouse pads.

It is well known that available illuminated mouse pads suffer from various technical difficulties limiting their effectiveness and desirability. Some illuminated mouse pads, such as the one described in U.S. Pat. No. 20020131270, contain no local light source and instead are illuminated by external light sources. Mouse pads that do contain local light sources, such as U.S. Pat. No. 7,175,310, U.S. Pat. No. 20040224107 and U.S. Pat. No. 6,635,336, are illuminated unevenly, having specific light patterns depending on the number, placement and type of light source design, or require alternating current power.

U.S. Pat. No. 20040224107 uses fiber optic cables to channel light in illuminated designs. In order to display different designs the fiber optic cables must be placed on the pad in different ways causing great expense and limiting the design options available.

U.S. Pat. No. 7,175,310 describes an illuminated mouse pad that is illuminated from within by a perimeter of light sources. Such a device suffers from great variation in illumination as areas closer to the light sources are illuminated more brightly than areas further away. Additionally, this device requires a significant number of light sources.

U.S. Pat. No. 6,635,336 is illuminated by an electroluminescent laminate. Such a device is incredibly costly to manufacture and requires a large power draw to operate brightly. In addition, electroluminescent laminate require alternating current, necessitating a transformer of significant size if the device is to draw power from a Universal Serial Bus (USB), which is only capable of providing direct current. Considering that USB ports are the primary method of attaching powered peripherals such as mouse pads, this limitation is significant.

The present invention provides a solution for the above problems by using an internal light source and an array of light diffusers that evenly redistribute emitted light without resorting to adding additional or external light sources. Such a light can be combined with a variety of designs without significant alteration and supplies uniform illumination, representing a substantial advancement over previous illuminated mouse pads. Additionally, such a light can be powered by direct current from a computer's Universal Serial Bus (USB), eliminating the need for a costly and large transformer.

SUMMARY OF INVENTION

It is an object of the present invention to provide a mouse pad that is illuminated from within by a series of diffusers.

It is another object of the present invention to provide an illuminated mouse pad comprising a light guide having a top side, a back side and a perimeter side, a light source for directing emitted light through a first portion of the perimeter of the light guide, and an array of light diffusers located on the back side of the light guide, said light diffusers capable of diffusing or spreading out or scattering light emitted by the light source to give a soft back light to the top side.

It is yet another object of the present invention to provide an illuminated mouse pad comprising a light guide having a top side, a bottom side and a perimeter side, a light source for directing emitted light through a first portion of the perimeter of the light guide, and an array of light diffusers located on the bottom side of the light guide, said light diffusers capable of diffusing or spreading out or scattering light emitted by the light source to give a soft back light to the top side.

It is still yet another object of the present invention to provide the illuminated mouse pad as above, wherein the array of light diffusers is a random array or an ordered array.

It is still yet another object of the present invention to provide the illuminated mouse pad as above, wherein the array of light diffusers comprises individual light diffusers that increase in size as they are further away from the light source.

It is yet a further object of the present invention to provide the illuminated mouse pad as above, wherein the array of light diffusers comprises individual light diffusers that increase in size as they are further away from the light source for the first 40 millimeters and are constant in size after a distance of 40 millimeters.

It is still yet a further object of the present invention to provide the illuminated mouse pad as above, wherein the array of light diffusers comprises individual light diffusers that vary in size from 0.1 millimeters to 3 millimeters.

It is still yet another further object of the present invention to provide the illuminated mouse pad as above, wherein the mouse pad contains a power/information port, such as, but not limited to a Universal Serial Bus (USB) port or similar connective port, to connect peripheral devices to a connected computer.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention (s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF DRAWINGS

FIG. 5 illustrates the normal reflection of light that occurs without diffusers.

FIG. 6 illustrates the diffusion caused by the diffusion areas.

DETAILED DESCRIPTION

With reference to the drawings, the present invention is a backlit illuminated computer mouse pad 10, especially useful for displaying sports affiliation and the like.

Figure 1:
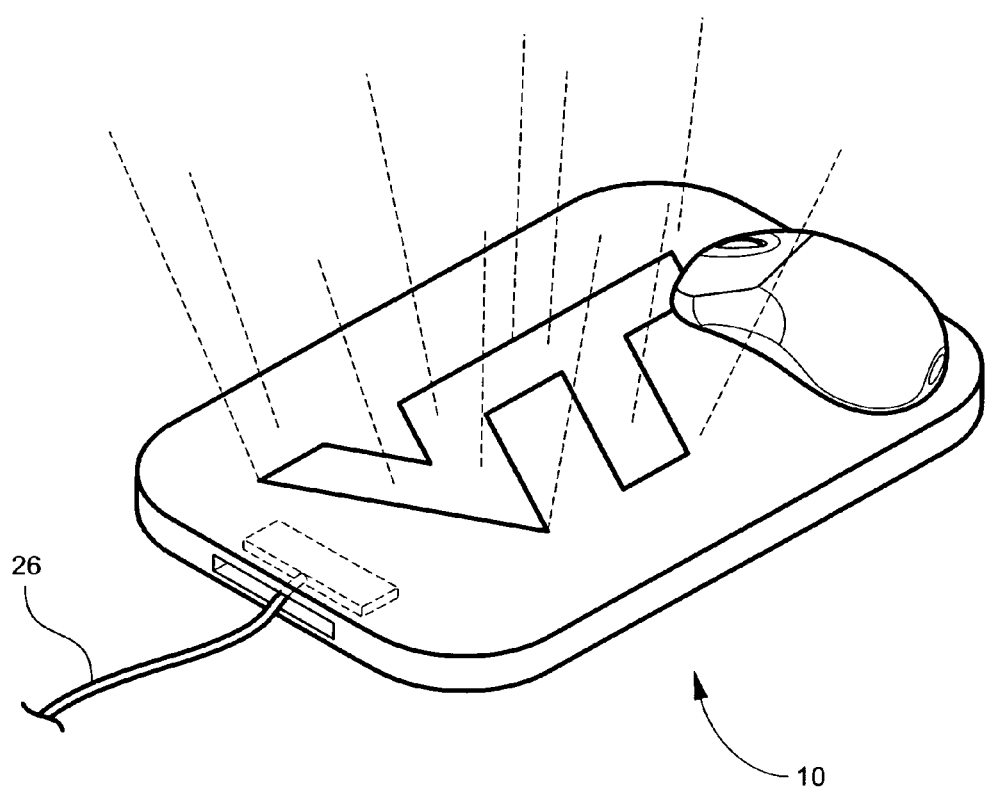
FIG. 1 illustrates an embodiment of the illuminated mouse pad device in use.

As illustrated in FIG. 1, the mouse pad 10, according to the present invention, comprises a light guide 12 having a light source 20 located at or near at least a first portion 16, of the perimeter of the light guide 12.

Figure 3:
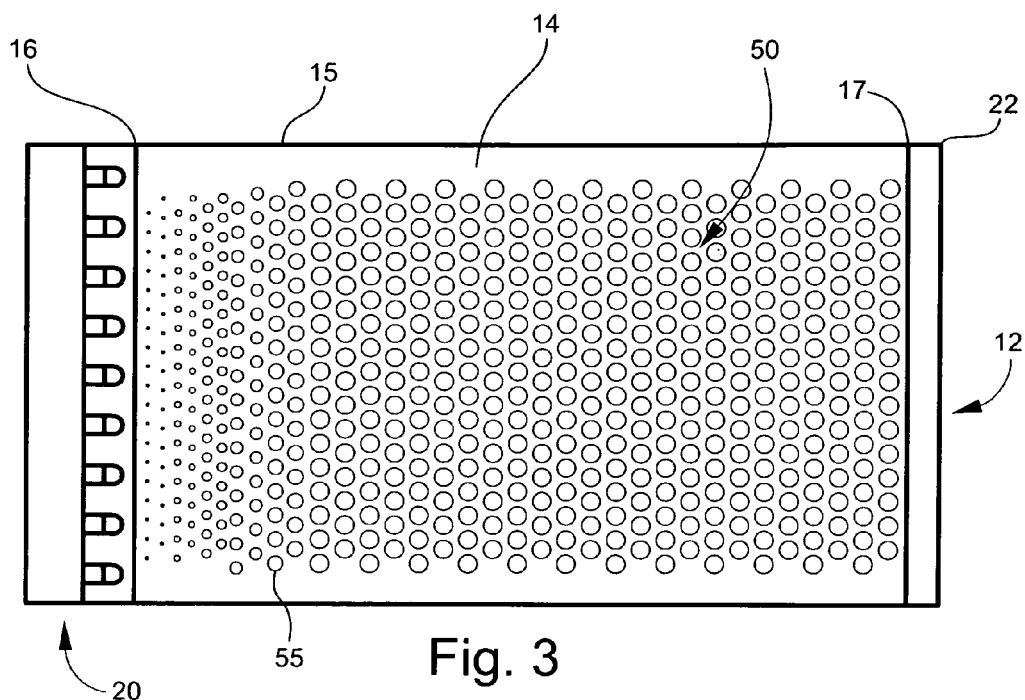
FIG. 3 illustrates a bottom side of a light guide where the light diffusers are arranged in a pattern such that the smallest light diffusers are closest to the light source and subsequently further individual light diffusers are larger, this pattern repeating itself for the first 40 millimeters, and subsequently further individual light diffusers then have a constant size.
Figure 4:
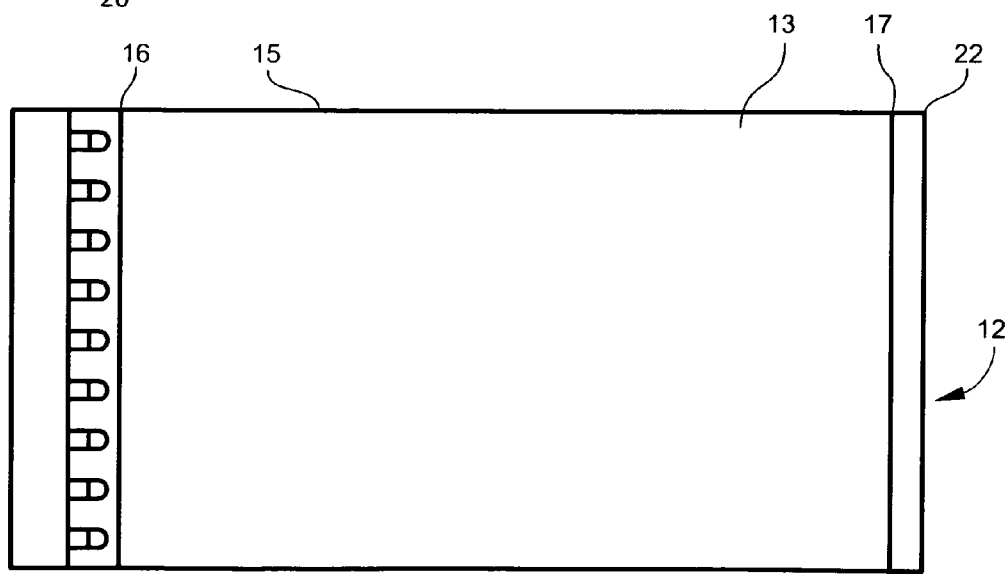
FIG. 4 illustrates the top side of a light guide.

In a preferred embodiment, illustrated in FIG. 3, the light guide 12 comprises a top side 13, a bottom side 14, and a perimeter side 15. On the bottom side 15, there is an array of light diffusers 50.

Figure 2:
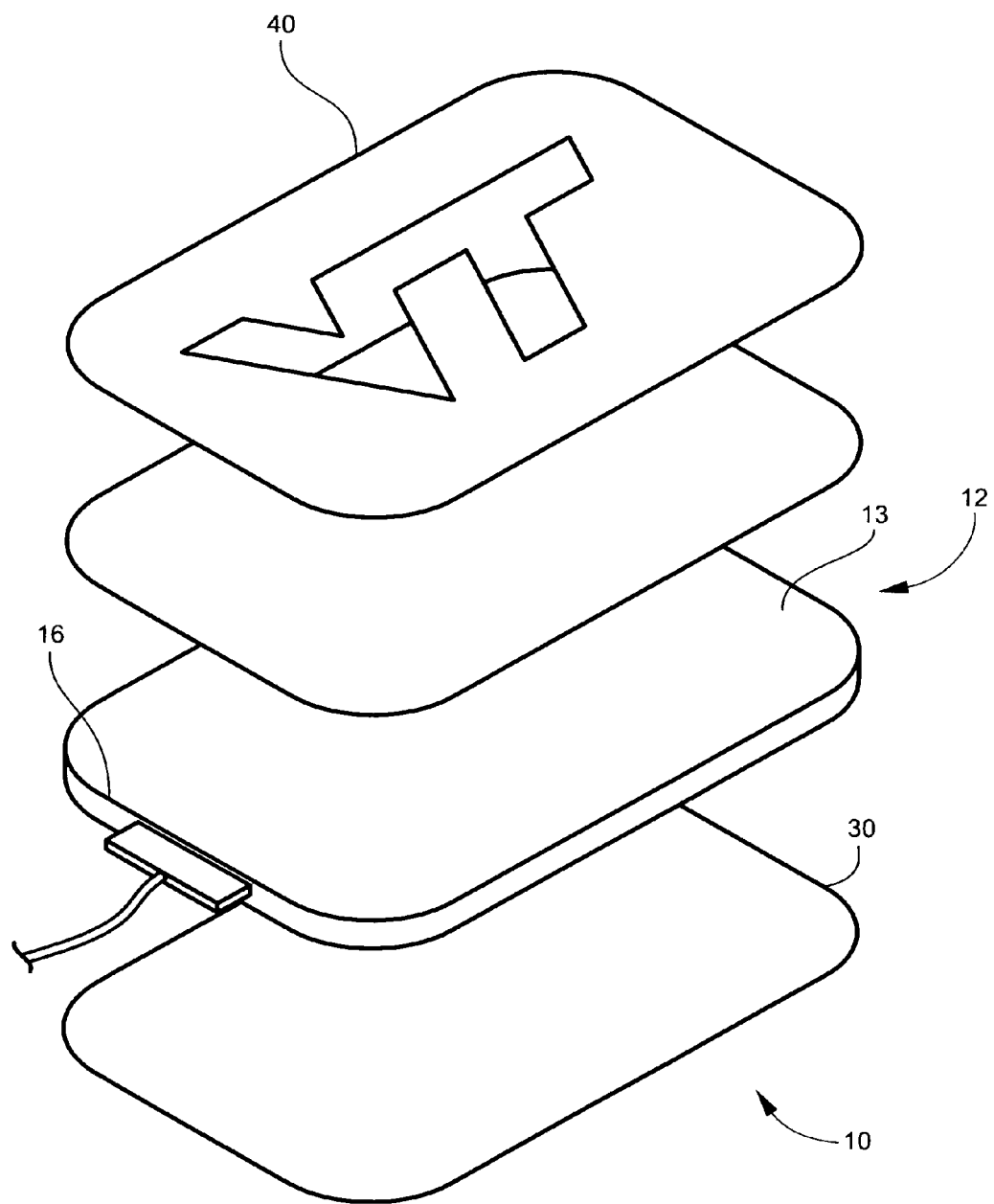
FIG. 2 illustrates an exploded view of an embodiment of the device featuring the light source and light source controller placed alongside the perimeter of the light guide.

In a preferred embodiment illustrated in FIG. 2, the light source 20 is at least one Light Emitting Diode (LED), or similar light source, arranged in an array of one or more along at least the first portion 16 of the perimeter side 15. This arrangement allows light emitted from the light source 20 to be directed into and through the light guide 12. Located on a second portion 17 of the perimeter side 15 opposite of the first portion 16 is a reflective/diffusive surface 22 facing the first portion 16 of the perimeter side 15.

In this preferred embodiment, the light source is powered via a power/information cable 26 such as, but not limited to, a Universal Serial Bus (USB) cable.

In this preferred embodiment there is bottom layer 30 adhered to the bottom side 14 of the light guide 12.

Further, in this preferred embodiment, there is a design layer 40 attached to the top side 13 of the light guide 12. The design layer 40 includes at least one opaque, semitransparent and/or transparent area.

As illustrated in FIG. 5 and FIG. 6, it is critical to the present invention that the bottom side 14 of the light guide 12 has the recited array of light diffusers 50. The light diffusers 50 are designed to frustrate total internal reflection (TIR) and to distribute light emitted from the light source 20 uniformly across the top side 13 of the light guide 12.

In a more preferred embodiment, the light diffusers 50 are arranged in a manner so that individual diffusers 55 further from the light source 20 are larger than those that are closer to the light source 20, and that the distribution of the individual diffusers 55 is organized in order to maximize the uniform illumination of the design layer.

In one embodiment of the array of diffusers 50, the individual light diffusers are arranged in a uniform pattern.

In another embodiment of the array of diffusers 50, the individual light diffusers 55 are arranged in a random pattern.

In yet another embodiment of the array of diffusers 50, the individual light diffusers 55 are arranged in a pattern such that those individual light diffusers 55 closest to the light source 20 are smaller than those that are further from the light source 12.

FIG. 3 illustrates still yet another embodiment of the array of diffusers 50, the individual light diffusers 55 are arranged where the smallest light diffusers 55 are closest to the light source 20 subsequently further individual light diffusers 55 are larger, this pattern repeating itself for the first 40 millimeters, and subsequently further individual light diffusers 55 then have a constant size.

In an alternate embodiment, the top side 13 of the light guide 12 is textured in a way to maximize the transmittance of light as according to Snell's Law.

Figure 7:
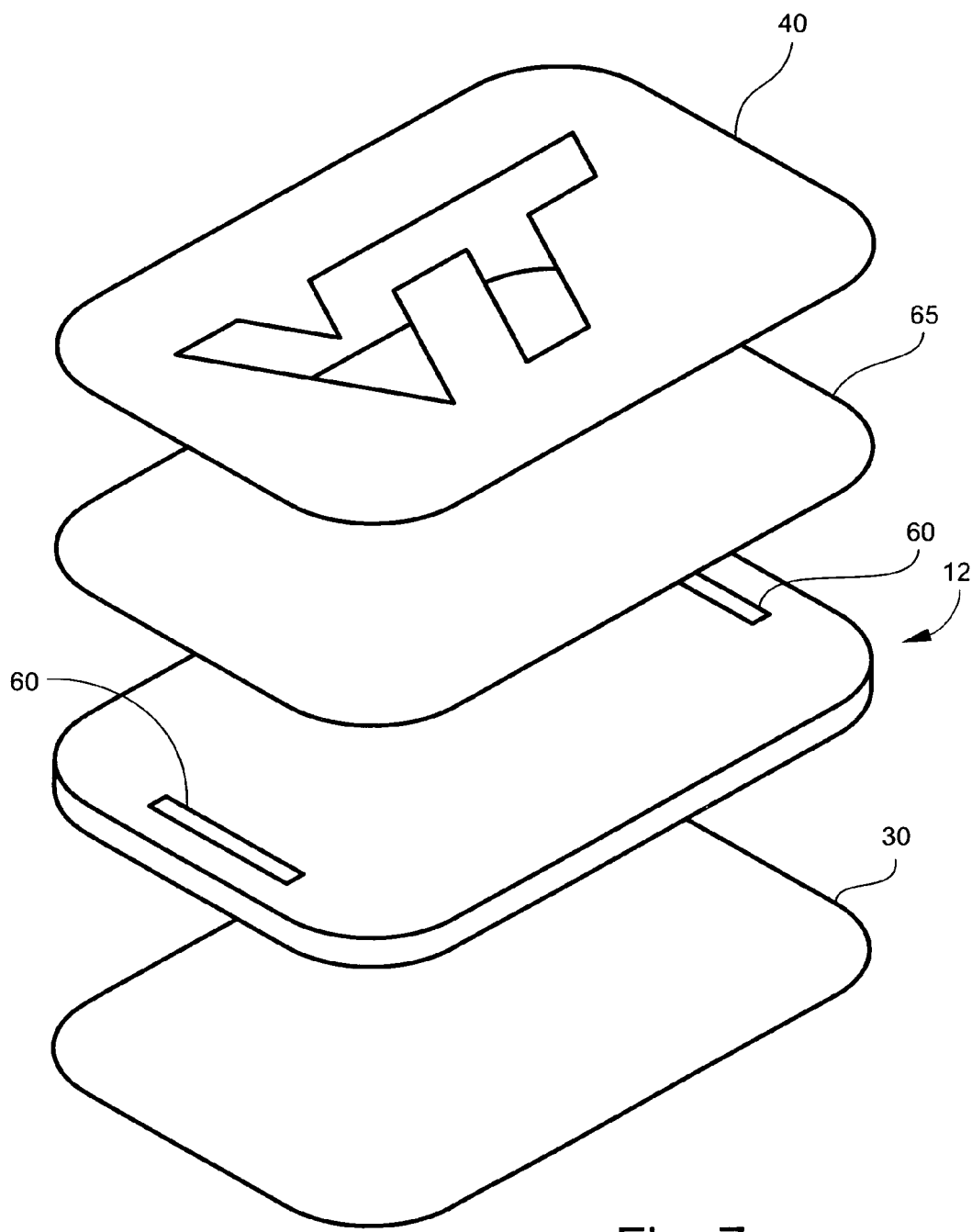
FIG. 7 illustrates a light guide featuring two channels.

In yet another embodiment of the present invention, illustrated in FIG. 7, the light guide 12, of the mouse pad 10, further comprises at least one, preferably two, incised channels 60. At least one incised channel 60 is adapted to receive the light source 20. The second incised channel 60 is adapted to receive the reflective/diffusive surface 22. These incised channels 60 are important when one desires that the perimeter side 15 of the light guide 12 have a clean and unencumbered design since locating the light source 20 within the light guide 12 the light source, and reflective/diffusive surface 22, may be hidden from view, by the design layer, while still allowing emitted light to travel through the light guide 12. In such an embodiment a transparent layer 65 is placed over the channels 60 securing and protecting components contained within.

Figure 8:
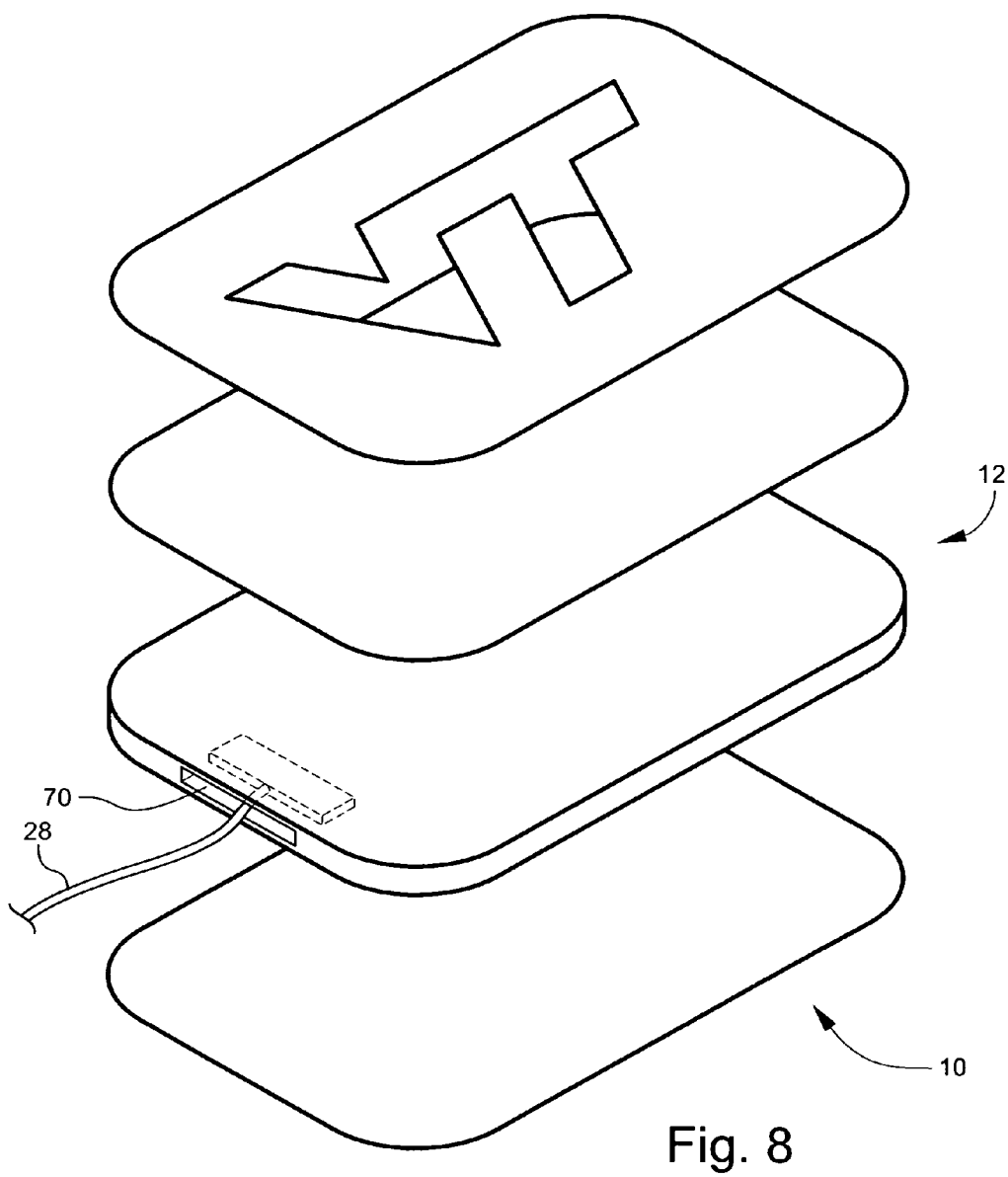
FIG. 8 illustrates a light guide featuring a recessed area located along a perimeter edge.

In still yet another embodiment of the present invention, illustrated in FIG. 8, the light guide 12 of the mouse pad 10 further comprises at least one recessed or removed area 70 from the perimeter of the light guard 12. This recessed or removed area 70 is adapted to receive the light source 20.

In yet another embodiment of the present invention, the mouse pad 10 includes a sensor or sensors such as, but not limited to, a thermal sensor or motion sensor, for detecting the presence of a user. If no user is present the device turns off the illumination.

Figure 9:
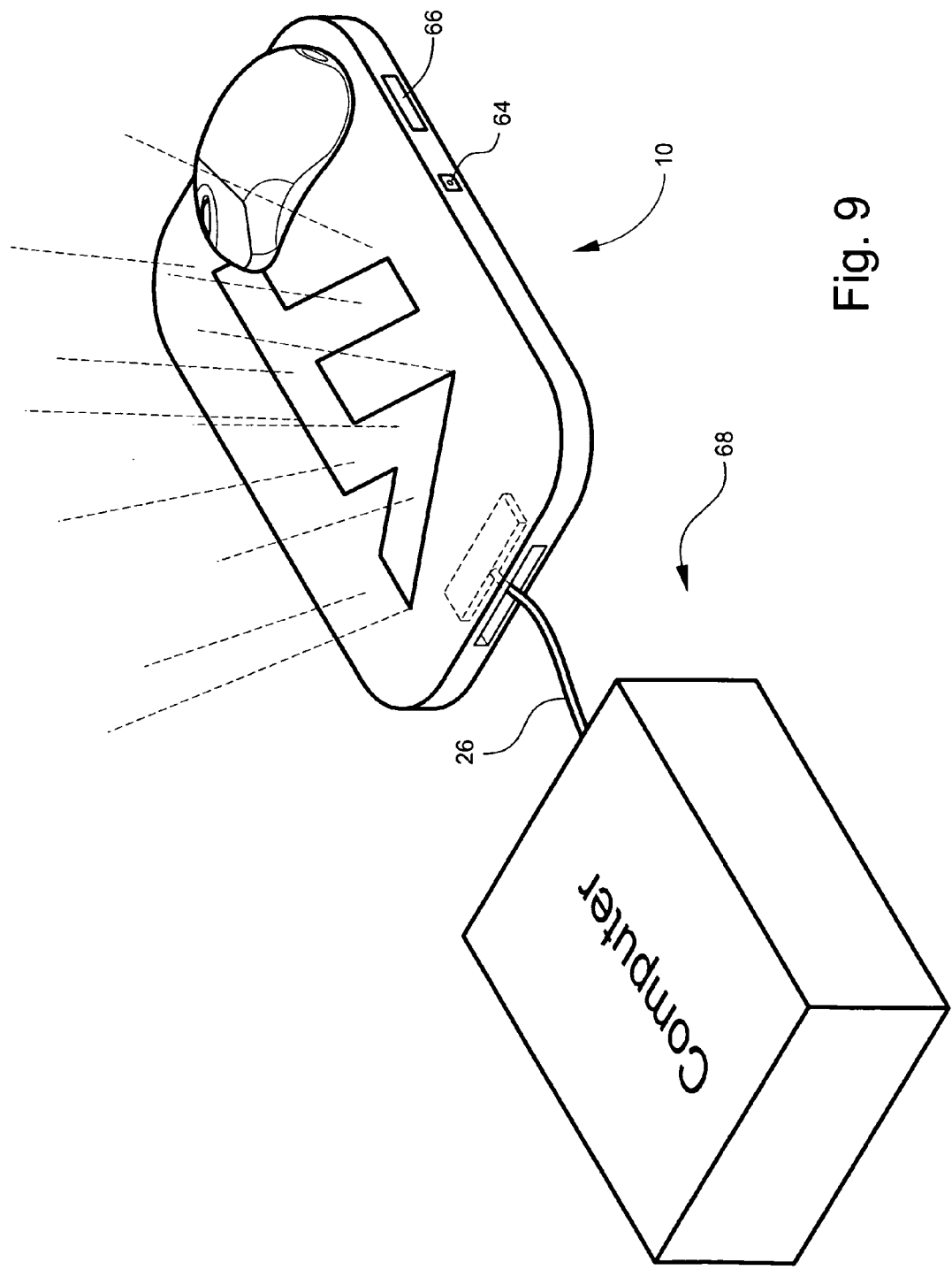
FIG. 9 illustrates an illuminated mouse pad featuring a connected computer, a power/information port, and a power switch.

As illustrating in FIG. 9, in still yet another embodiment of the present invention the mouse pad 10 includes one or more information/power ports 66 such as, but not limited to, a USB port, to attach peripheral devices to the connected computer 68. The mouse pad 10 can transmit information and power between the connected computer 68 and attached peripheral devices.

In still yet a further embodiment of the present invention, the mouse pad includes a power switch 64 allowing a user to power off the mouse pad illumination.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. An illuminated mouse pad comprising a light guide having a top side, a bottom side and a perimeter side, a light source for directing emitted light through a first portion of the perimeter of the light guide, and an array of light diffusers located on the bottom side of the light guide, said light diffusers capable of diffusing or spreading out or scattering light emitted by the light source to give a soft back light to the top side and wherein the array of light diffusers comprises individual light diffusers that increase in size as they are further away from the light source.

2. The illuminated mouse pad according to claim 1, wherein the mouse pad receives power from a connected computer via an information/power port.

3. The illuminated mouse pad according to claim 2, wherein the mouse pad includes additional information/power ports to connect peripheral devices to a connected computer.

4. The illuminated mouse pad according to claim 1, wherein the array of light diffusers is a random array or an ordered array.

5. The illuminated mouse pad according to claim 1, wherein the array of light diffusers comprises individual light diffusers that vary in size from 0.1 millimeters to 3 millimeters.

6. The illuminated mouse pad according to claim 1, wherein the array of light diffusers comprises individual light diffusers that increase in size as they are further away from the light source for the first 40 millimeters and are constant in size after a distance of 40 millimeters.

* * * * *